Figure 1:
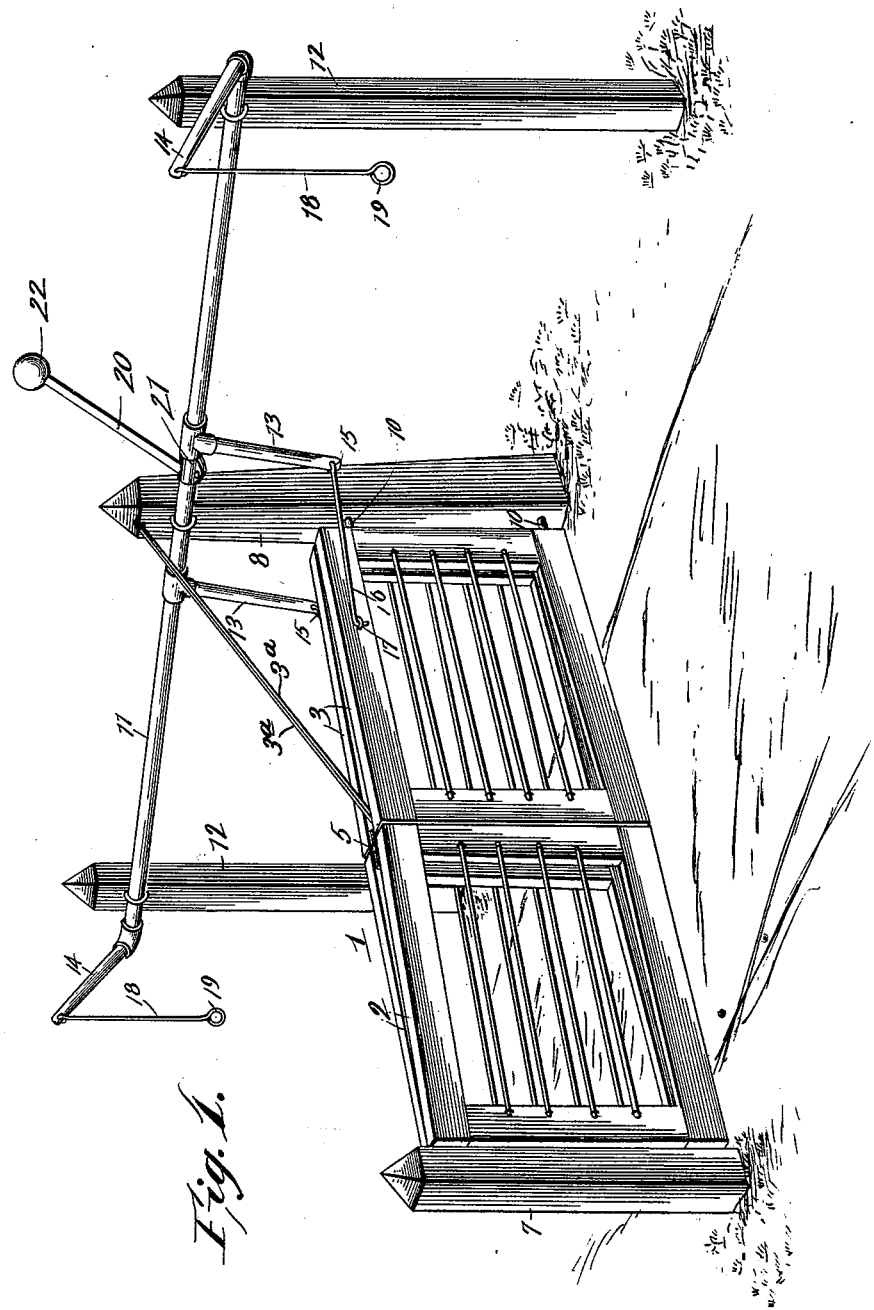

No. 652,760. Patented July 3, 1900.
F. A. ENGLEBRIGHT.
GATE.
(Application filed Mar. 21, 1900.)
(No Model.) 2 Sheets—Sheet 1.

Witnesses
C. H. Walker.
J. H. Riley.

F. A. Englebright Inventor
By his Attorneys,
C. A. Snow & Co.

No. 652,760. Patented July 3, 1900.
F. A. ENGLEBRIGHT.
GATE.
(Application filed Mar. 21, 1900.)
(No Model.) 2 Sheets—Sheet 2.
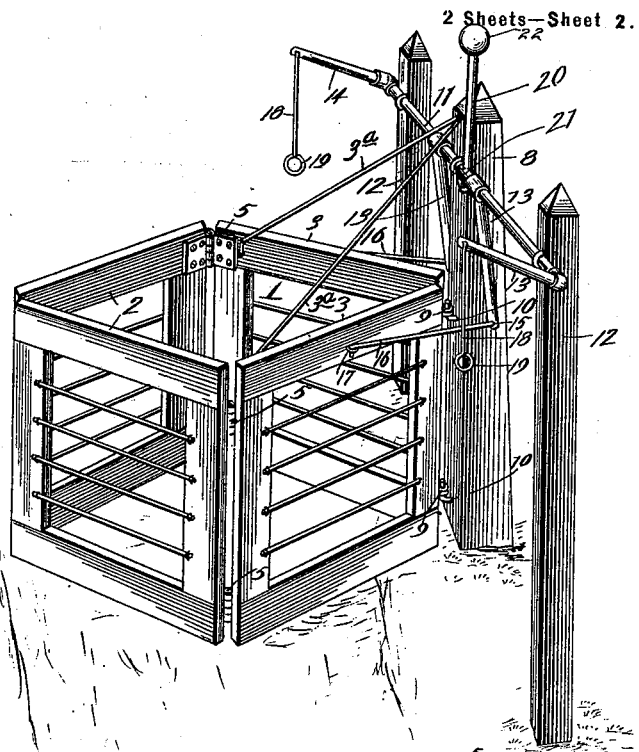
Fig. 2.
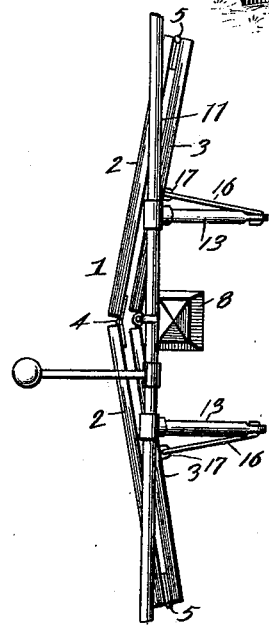
Fig. 3.
Witnesses
C. H. Walker
J. H. Riley
F. A. Englebright Inventor
By his Attorneys.
C. A. Snow & Co.
THE NORRIS PETERS CO., PHOTO-LITHO., WASHINGTON, D. C.

UNITED STATES PATENT OFFICE.

FREDERICK A. ENGLEBRIGHT, OF FARMINGTON, IOWA.

GATE.

SPECIFICATION forming part of Letters Patent No. 652,760, dated July 3, 1900.

Application filed March 21, 1900. Serial No. 9,557. (No model.)

*To all whom it may concern:*

Be it known that I, FREDERICK A. ENGLEBRIGHT, a citizen of the United States, residing at Farmington, in the county of Van Buren and State of Iowa, have invented a new and useful Gate, of which the following is a specification.

The invention relates to improvements in gates.

The object of the present invention is to improve the construction of gates and to provide a simple and comparatively-inexpensive one, of great strength and durability, capable of being readily operated at a distance from either side of it and of being compactly arranged at opposite sides of a hinge-post when open, whereby the effect of the wind will be equalized.

The invention consists in the construction and novel combination and arrangement of parts hereinafter fully described, illustrated in the accompanying drawings, and pointed out in the claims hereto appended.

In the drawings, Figure 1 is a perspective view of a gate constructed in accordance with this invention and shown closed. Fig. 2 is a similar view, the gate being partially open. Fig. 3 is a plan view, the gate being open.

Like numerals of reference designate corresponding parts in all the figures of the drawings.

1 designates a gate composed of front and rear leaves or sections 2 and 3, arranged in pairs, as clearly shown in Fig. 1 of the accompanying drawings, and each leaf or section preferably consists of a rectangular frame and a series of wires. Smooth or barbed wires may be employed and any desired construction of leaf or section may be used. The front leaves or sections 2, which are arranged side by side and which constitute the front portion of the gate 1 when the latter is closed, as shown in Fig. 1, are connected at their front or outer ends by hinges 4, and the inner ends of the front leaves or sections 2 are connected by hinges 5 with the inner adjacent ends of the rear leaves or sections 3, the hinges 5 being secured to the inner faces of the adjacent ends of the front and rear leaves or sections, whereby the said adjacent ends are adapted to abut against each other when the gate is closed to prevent the gate from breaking at the center and swinging laterally in either direction. This construction enables the gate to resist pressure from either side, and the front end of the gate, when the latter is closed, abuts against a latch-post 7.

The rear ends of the rear leaves or sections, which are supported by braces 3ª, are hinged together and to a hinge-post 8 by means of eyes 9 and pintles 10, the eyes 9 being arranged in pairs near the top and bottom of the gate, as clearly shown in Fig. 2, and the pintles, which are located near the top and bottom of the gate, extend through the pairs of eyes. The braces 3ª, which are inclined, are constructed of wire or other suitable material and extend upward from the outer ends of the rear leaves or sections to the top of the post 8.

The gate is adapted to move bodily transversely of the roadway from the latch-post to the hinge-post and from the position illustrated in Fig. 1 of the drawings to that shown in Fig. 3. In changing positions in this manner the leaves or sections open laterally, as illustrated in Fig. 2 of the drawings, and the continued rearward movement of the gate opens the rear sections 3 and the front sections 2 completely, causing the latter to fold against the former. When the gate is open, as shown in Fig. 3, the sections extend rearward at a slight angle to each other, and the rear sections 3 are made slightly shorter than the front sections 2 to permit the parts to assume the positions shown in Fig. 3.

The gate is opened and closed by means of a horizontal rock-shaft 11, located above the gate and journaled in suitable bearings of the hinge-post 8 and uprights 12, located at opposite sides of the gate. The rock-shaft, which may be constructed of tubular metal or any other suitable material, is provided with inner and outer arms 13 and 14, arranged at opposite sides of the center of the shaft and at the ends thereof. The inner arms 13, which are located at opposite sides of the gate and the hinge-post, extend downward from the rock-shaft and are adapted to swing forward and rearward from the position indicated in Fig. 1 to that shown in Fig. 3 to open and close the gate. The lower ends of the depending arms 13 are perforated to receive eyes 15 of links or rods 16, which extend to points intermediate of the ends of the rear leaves or sections 3 of the gate. The front ends of the links or rods, which are disposed substantially in a horizontal plane, are engaged in eyes 17, located at the outer faces of the rear sections or leaves 3 at the tops of the frames thereof. By this construction the links or rods are hingedly or movably connected with the rear leaves and with the lower ends of the arms 13, whereby when the rock-shaft is oscillated the rear leaves or sections of the gate will be swung backward and opened or forward and closed to open and close the gate. The outer arms, which are arranged at an angle to the inner arms 13, extend upward at an inclination when the parts are arranged as shown in Fig. 1, and they are adapted to be swung downward to rotate the rock-shaft. The outer ends of the arms 13 are perforated to receive depending rods 18, forming handles, and provided at their lower ends with suitable grips 19. These rods are adapted to be readily grasped from the ground and by a person within a vehicle or on horseback without dismounting.

The rock-shaft 11 carries a weighted arm 20, located adjacent to the post 8 and adjustably secured at its lower end to the rock-shaft by a suitable clamp 21 and provided at its upper end with a weight 22, which may be in the form of a ball or of any other shape. When the gate is half-open, the weighted arm is in a perpendicular position, and it is adapted to complete the opening and closing movement of the gate after the rock-shaft has been rotated sufficiently to carry the weighted arm to a perpendicular position. When the gate is closed, the weighted arm inclines rearwardly, as illustrated in Fig. 1 of the drawings, and holds the gate firmly in its closed position and obviates the necessity of employing a latch or other fastening device. When the gate is in its open position, as illustrated in Fig. 3 of the drawings, the weighted arm inclines forward or outward and operates to hold the gate in such position. The clamp 21 enables the arm to be readily adjusted, so that it will be in a perpendicular position when the gate is half-open.

It will be seen that the gate is simple and comparatively-inexpensive in construction, that it possesses great strength and durability, and that it may be readily operated to open and close it. It will also be apparent that the sections are held against lateral movement by pressure exerted on the gate when the latter is closed and that the leaves fold compactly against the hinge-post and leave a maximum amount of space between them and the latch-post. Furthermore, it will be clear that the weighted arm holds the gate in its open and closed positions, that it obviates the necessity of employing fastening devices for this purpose, and that it completes the opening and closing movement of the gate.

What is claimed is—

1. A gate comprising the front and rear leaves or sections arranged in pairs, the leaves or sections at the front of the gate being hinged together at their front ends and similarly connected at their rear ends to the adjacent ends of the rear leaves or sections, and hinges for connecting the rear leaves or sections to a post or support, substantially as described.

2. A gate comprising the front and rear leaves or sections arranged in pairs, the members of each pair of leaves or sections being hinged together at their outer ends, and hinges for connecting the inner ends of the front leaves or sections to the adjacent ends of the rear leaves or sections, combined with means for swinging the rear leaves or sections to and from each other, whereby the gate is opened and closed, substantially as described.

3. The combination with a hinge-post, of a gate hinged to the hinge-post and composed of front and rear sections arranged in pairs and hinged together at their outer ends, the inner ends of the leaves or sections of one pair being hinged to the adjacent ends of the leaves or sections of the other pair, and means for operating the gate, substantially as described.

4. The combination of a gate composed of front and rear leaves or sections arranged in pairs and hinged together at their adjacent ends, and a rock-shaft provided with arms located at opposite sides of the gate and connected with the rear leaves or sections and adapted to swing the same to and from each other, whereby the gate is opened and closed, substantially as described.

5. The combination of a gate composed of front and rear leaves or sections arranged in pairs and hinged together at their adjacent ends, a rock-shaft provided with inner and outer arms, links connecting the inner arms with the rear sections of the gate, and handles connected with the outer arms, substantially as described.

6. A gate comprising the front and rear leaves or sections arranged in pairs, the members of each pair being hinged together at their outer ends, and the rear sections being shorter than the front sections and hinged to the adjacent ends thereof, substantially as described.

In testimony that I claim the foregoing as my own I have hereto affixed my signature in the presence of two witnesses.

FREDERICK A. ENGLEBRIGHT.

Witnesses:
LEO EDWARDS,
THOS. SIMPSON.